B. D. PINKNEY.
STUFFING BOX.
APPLICATION FILED JAN. 12, 1917.

1,248,397.

Patented Nov. 27, 1917.

Witnesses:
George E. Hieber.
Robert J. Doll.

Inventor:
Bryan D. Pinkney.

UNITED STATES PATENT OFFICE.

BRYAN D. PINKNEY, OF CINCINNATI, OHIO, ASSIGNOR TO THE TRIUMPH MANUFACTURING COMPANY, OF CINCINNATI, OHIO, A CORPORATION OF OHIO.

STUFFING-BOX.

1,248,397.  Specification of Letters Patent.  Patented Nov. 27, 1917.

Application filed January 12, 1917. Serial No. 141,921.

*To all whom it may concern:*

Be it known that I, BRYAN D. PINKNEY, a citizen of the United States, residing at Cincinnati, in the county of Hamilton and State of Ohio, have invented a new and useful Stuffing-Box, of which the following is a specification.

My invention relates to improvements in stuffing-boxes, and more particularly to stuffing-boxes designed for dough mixing machines wherein a rotating shaft must be lubricated, and at the same time none of the lubricant must work into the machine where the dough or other material is being mixed, or none of the ingredients must leak, particularly the salt water or other liquids of a similar injurious effect.

I attain these objects by the mechanism illustrated in the accompanying drawing, in which—

Figure 1:
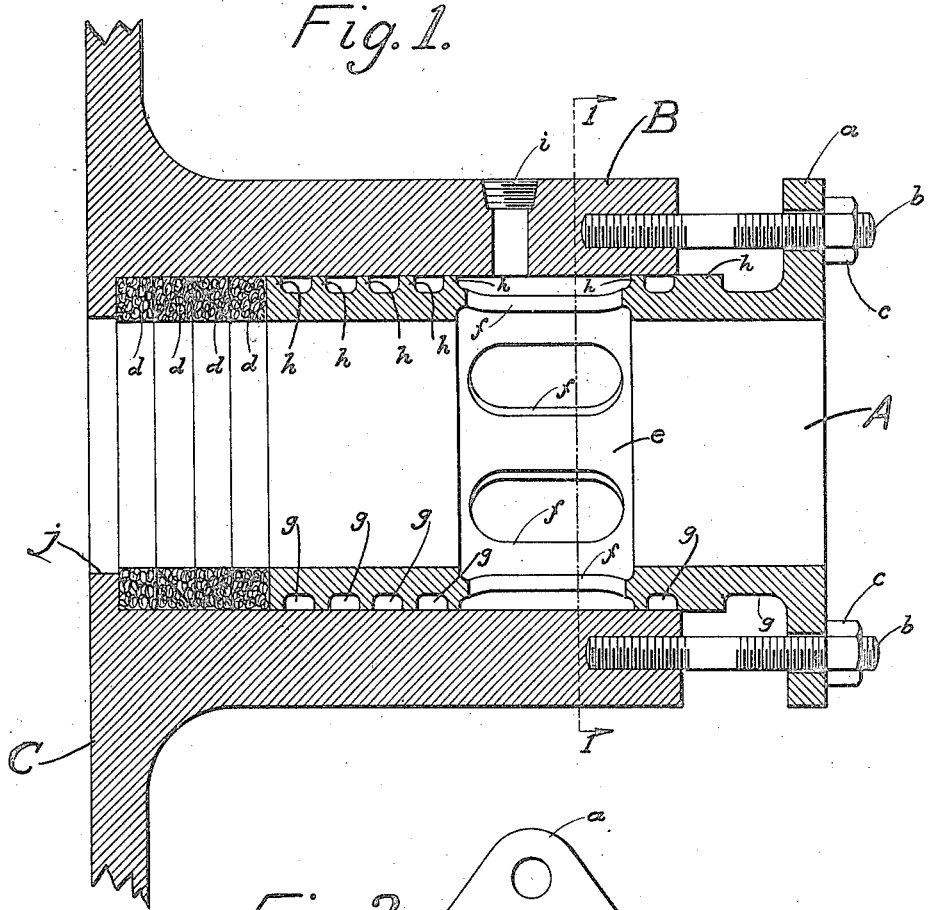
Figure 2:
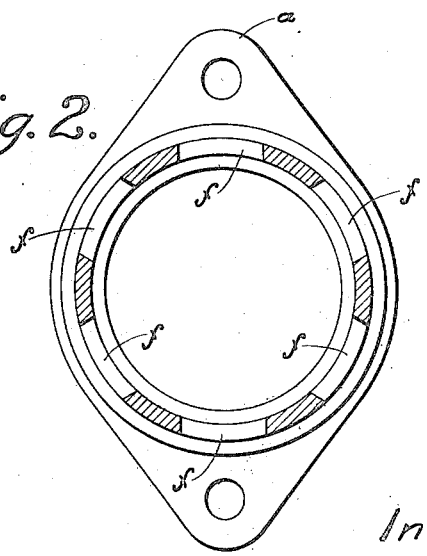

Figure 1 is a sectional elevation of my improved stuffing-box; Fig. 2, a cross section at line 1—1, Fig. 1.

Similar letters refer to similar parts throughout the several views.

Referring to the drawing, A is the main body of the stuffing-box which fits in a cylindrical box B; $a$ is a flange provided with a plurality of holes in which are inserted a plurality of take-up adjusting screws $b$, provided with nuts $c$, to take up the wear of the renewable packings $d$ of any familiar construction; $e$ is an intermediate recessed part of the stuffing-box I have called the expansion chamber and is provided with perforations $f$ for the purpose of holding a quantity of suitable lubricant, generally grease; $g$ are recesses in the outer part of the main body A for the purpose of collecting surplus grease which works its way through the slight clearances between the main body A and the bore of the cylindrical box B, said surplus grease acting as a cooling agent for the main body A; $h$ are a plurality of raised ribs resulting from the recesses $g$, and which act as radiating surfaces for the main body A; $i$ is an aperture, ordinarily provided with a grease cup, through which the grease is supplied to the recessed part $e$ of the stuffing-box expansion chamber; $j$ is a shoulder of the main body C and serves as a stop for the fibrous packing as pressure is exerted due to the tightening action of the take-up adjusting screw nuts $c$.

The method of operation of my improved stuffing-box is as follows: The cylindrical box or outer casing B is part of a bearing connected with a receptacle C, which holds material liable to leak. A shaft, not shown in the drawing, rotates in the stuffing-box A, and the renewable packing $d$ of any familiar construction, generally of a fibrous material, serves as a means to prevent leakage from the receptacle C. In the recessed part $e$ is a quantity of lubricant, preferably grease, which enters through the perforations $f$ from the source of supply at $i$. Now as the shaft rotates the heat given off by the friction surfaces raises the temperature of the grease, which in turn causes an expansion of said grease so that a pressure results, and that part of the shaft adjacent to the recessed part $e$ of the stuffing-box practically runs in a lubricant bath, and hence frictionless, for the most part. The clearance between the bore of the stuffing-box and the coacting shaft is so slight that the grease cannot escape or leak into the receptacle C, on account of the fibrous packing $d$, or to the outside at flange $a$ because the semi-molten grease cools as soon as it is exposed to the atmosphere, for the atmosphere stops the flow of the semi-molten grease when the semi-molten grease is being attracted by leakage through a minute or very confined space, such as the clearance between the co-acting shaft and my improved stuffing-box, which clearance usually is three-thousandths of an inch. As the packings $d$ wear, an adjustment of the nuts $c$ on the studs $b$ forces the packings into a firm body which exert the necessary pressure on the shaft. The ribs $h$, serving as radiating surfaces for the stuffing-box, give off the heat, and a cooling process takes place due to the grease in recesses $g$, said grease finding its way into said recesses through leakage, or any other suitable means.

Having thus described my invention, what I claim as new and desire to secure by Letters Patent, is—

In a stuffing-box of the character described, the combination of an outer casing with an inner shoulder; a tubular one-piece gland extending into said casing and provided with a plain inner end, a flanged outer end, and an intermediate perforated recessed expansion chamber for the lubricant, said flanged outer end being provided with a plurality of holes; a plurality of annular ribs on the periphery of said tubular one-piece gland to serve as radiating surfaces; a plurality of take-up adjusting screws fastened in the outer end of said outer casing and extending through the holes in flange of said tubular one-piece gland; and a fibrous packing located between the inner shoulder of the outer casing and the inner edge of said tubular one-piece gland, substantially as described.

In testimony whereof I have hereunto set my hand in presence of two subscribing witnesses.

BRYAN D. PINKNEY.

Witnesses:
CHAS. W. MUELLER,
ALVINA SCHNEIDER.

Copies of this patent may be obtained for five cents each, by addressing the "Commissioner of Patents, Washington, D. C."